Sept. 22, 1964 A. W. HUGHES 3,149,923
FAT REDUCING AND RENDERING DEVICE
Filed Oct. 15, 1959 2 Sheets-Sheet 1
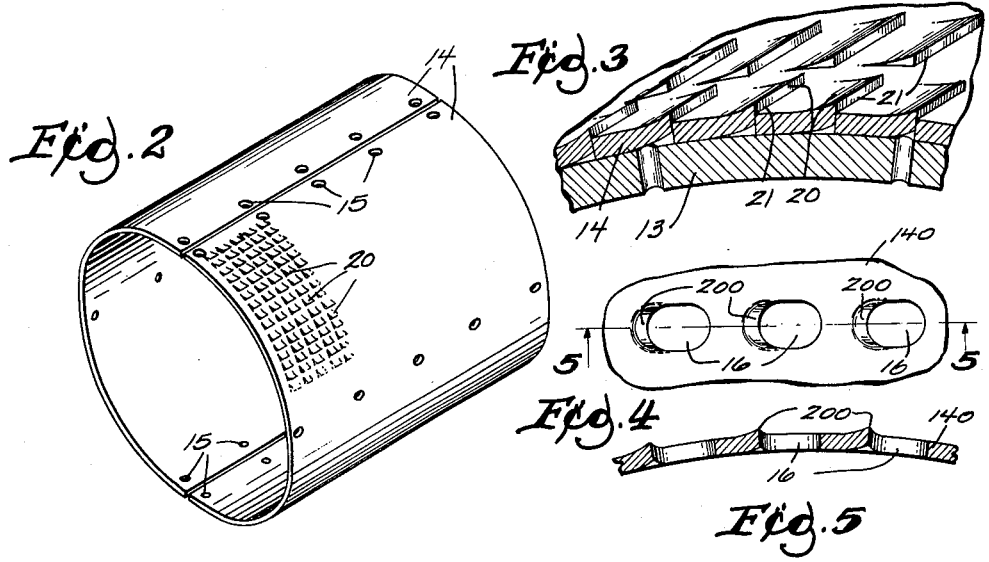
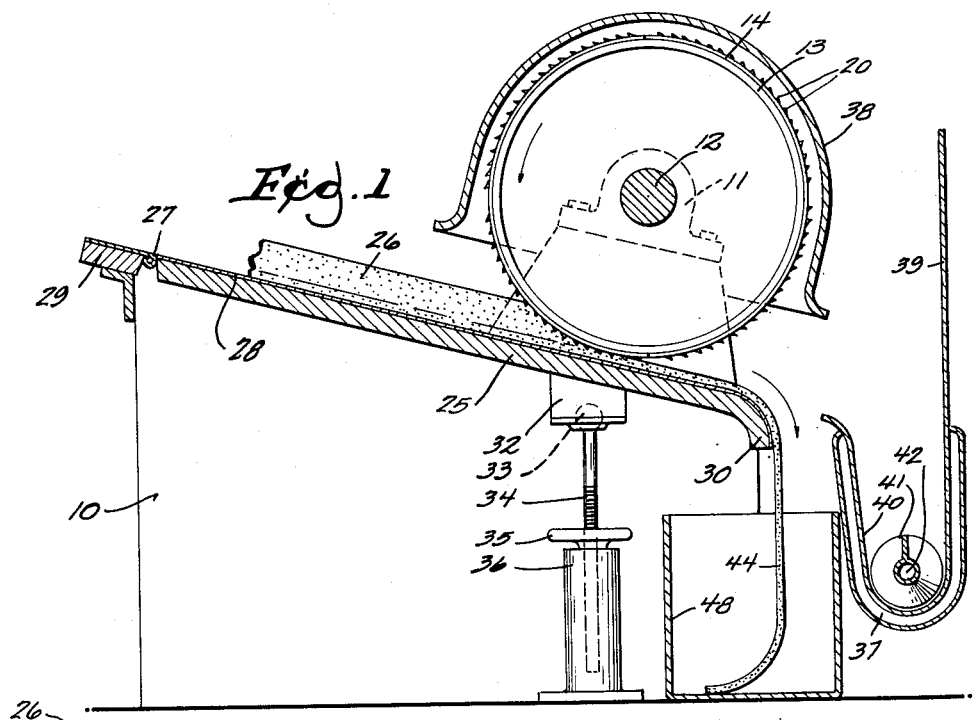
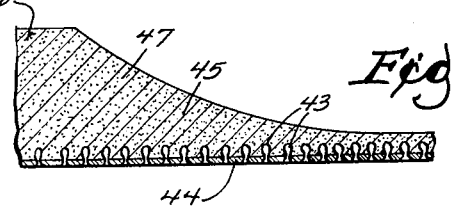
INVENTOR.
ALVIN W. HUGHES
BY
Wheeler, Wheeler & Wheeler
ATTORNEYS Sept. 22, 1964 A. W. HUGHES 3,149,923
FAT REDUCING AND RENDERING DEVICE
Filed Oct. 15, 1959 2 Sheets-Sheet 2

INVENTOR.
ALVIN W. HUGHES
BY
Wheeler, Wheeler & Wheeler
ATTORNEYS

United States Patent Office 3,149,923
Patented Sept. 22, 1964

3,149,923
FAT REDUCING AND RENDERING DEVICE
Alvin W. Hughes, 4N194 Church Road, Bensenville, Ill.
Filed Oct. 15, 1959, Ser. No. 846,582
4 Claims. (Cl. 23—280)

This invention relates to a device and method for reducing fat to cream-like consistency, with particular reference to fat still attached to hides, the ultimate objective being to use the fat for lard or tallow. The edible fat is removed with such accuracy of control as to depth of removal as to avoid contamination of the fat with the hair or oil follicles or the like which project into the fat from the skin or hide.

A rotatably mounted drum which may be operated at high speed carries a sheet of material having integral portions deformed outwardly to provide shallow teeth. In one embodiment, provision is made for relative adjustment between the toothed drum and a table which supports the work for passage beneath the drum, the arrangement being such that the clearance can be adjusted with accuracy to remove the fat to a precisely determined depth. In practice, it is preferred that the drum rotate on a fixed axis and that the adjustment be made by pivoting for movement to and from the drum a table section which is hinged at a point remote from the drum and has an adjusting screw which fixes the position of a free hingedly movable portion of such table section toward and from the drum.

The toothed sheet which is wrapped around the drum is desirably readily removable therefrom for cleaning. The teeth are formed by a press which shears portions of the sheet and raises the sheared margins upwardly. This may all be done in a single operation, or the sheet may first be perforated and its margins adjacent the openings may subsequently be elevated.

In an alternative arrangement, the toothed drum is rotatable in a casing through which the work is fed, the objective in that case being to reduce the fat to fine particles or to a liquid without regard to the removal of the fat from a skin.

In either case, the fatty material is so thoroughly disintegrated by what amounts to abrasion that much of it is reduced to a liquid and in a very real sense is rendered mechanically without extraneous heat. Heat may be supplied in furtherance of the rendering operation if desired.

In the drawings:

FIG. 1 is a view in section through a device embodying the invention.

FIG. 2 is an enlarged fragmentary detail view in perspective showing the wrap-around split tubes which, when applied to a drum as in FIG. 1, are used to provide the drum with teeth.

FIG. 3 is a greatly enlarged detail view fragmentarily showing in section and perspective the construction of the toothed wrap-around sheet and the drum to which it is applied.

FIG. 4 is a fragmentary detail view in plan of a modified type of sheet provided with teeth and applicable to such a drum.

FIG. 5 is a view taken in section on the line 5—5 of FIG. 4.

FIG. 6 is a greatly enlarged detail view in section through a workpiece such as a skin having fat clinging to its inner surface and partially removed by reason of the operation of such a drum as illustrated in FIG. 1.

Figure 7:
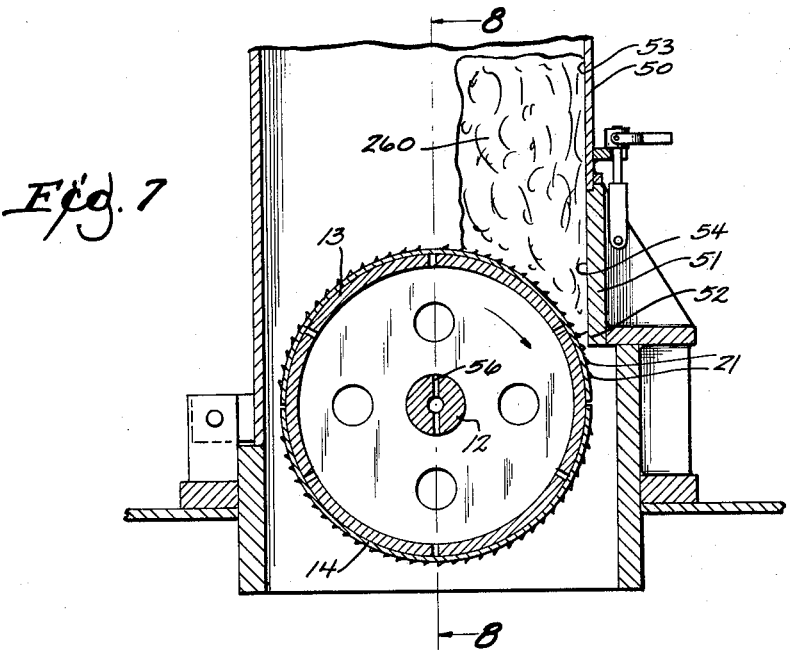
FIG. 7 is a view in transverse section through a different apparatus for grating meat or fat, the drum and toothed sheets applied thereto being similar to those shown in FIGS. 1, 2 and 3.

In the construction shown in FIGS. 1 to 6, the stand 10 has pillow blocks, one of which appears at 11 for supporting the shaft 12 upon which the pulley-like drum 13 is mounted. From the standpoint of FIG. 1, the rotation would be counterclockwise.

The periphery of the drum is provided with a multitude of fine teeth which may conveniently be made according to the suggestions of FIGS. 2 to 5. In FIGS. 2 and 3, the sheets 14 in the form of split tubes are separately fabricated to be attached to the drum 13 by means of screws or bolts for which holes are provided at 15. Each of the sheets 14 has rows of teeth 20 made as best shown in FIG. 3 by making shear cuts 21 and deforming slightly outwardly from the adjacent plane of the sheet the sheared margins which form the teeth 20. It will be noted that the outward deformation of the teeth is less than the thickness of the sheet 14 in which the teeth are formed. Thus, there are no openings left in the sheet, the sheared margins remaining closed. The sheets in which the teeth are formed are readily wrapped around the pulley-like drum 13 and secured thereto, and they may be removed with equal facility for the cleaning required of apparatus which handles food.

An alternative method of forming the teeth is shown in FIGS. 4 and 5 wherein the sheet 140 has been shown punched with holes at 16, corresponding margins of which have been deformed outwardly to form the teeth 200. It will be understood, of course, that the teeth are by no means necessarily in peripherally straight rows as shown, the showing in this regard being merely for convenience.

Movable to and from the toothed periphery of the assembled drum is a table section 25 which is desirably inclined to facilitate the feeding of a workpiece 26 beneath the toothed drum. The inclination is such that gravity tends to move the workpiece in the same direction in which it tends to be forced when engaged by the teeth of the rotating drum. A hinge 27 supports the upper end of the movable table section 25. A surface ply 28 of stainless steel or the like may cover the entire surface of the table including the relatively fixed section 29 as well as the hingedly movable lower section 25. At its free lower end, the movable section 25 may have a downwardly curved margin 30, this being more or less optional.

For effecting the movement of the free end portion of the hinged table section 25 to and from the drum 13, a jack screw is desirably employed. A fitting 32 on the under side of the table section 25 is socketed to receive the ball 33 on the upper end of the screw 34. A hand wheel 35 permits the operator to adjust the screw 34 in threadedly socketed base 36.

The drum is preferably housed rather completely within a shroud at 38. Beyond the drum in the direction in which the creamed fat is discharged centrifugally therefrom is means for intercepting the liquid and solid particles, such means desirably including a panel or baffle at 39 and a trough 40 in which there may be a discharge feed screw 41. The feed screw 41 may have a central bore at 42 if desired, and the trough 40 may have a jacket space 37 if desired, the purpose in either case being to admit steam for the heating of the screw and the trough so that rendering may proceed immediately upon delivery of the fat into the trough. It will be understood that both the drum and the screw are power driven, but means for driving the same are not shown for the reason that any appropriate driving connections may be employed.

For sanitary reasons, the presence of hair follicles in fat destined for use in food is objectionable. These hair follicles 43 (FIG. 6) project from the skin or hide 44 into the underlying fat 45. Accordingly, one reason for the micrometer-like adjustment of the clearance between the toothed drum 13 and the table 25 is to be able to grate and remove from a given hide all of the edible fat without taking any of the fat in which there are hair or oil follicles such as those shown at 43 in FIG. 6. The arcuate line 47 in FIG. 6 shows the cut made by the toothed periphery of such a drum as that shown in FIG. 1, and it will be noted that this reaches tangency or parallelism with the skin 44 at a point which is just above the level to which the follicles 43 penetrate.

Still further fat removal from the skin may be required before the skin is ready for tanning. This may be done with apparatus comparable to that herein disclosed, but the present invention is concerned only with the removal of the edible fat. The skin 44 from which the edible fat has been removed may be received into a container such as that shown at 48 in FIG. 1. The arrangement is such that the blocks of fat with attached skin may be fed beneath the abrading drum regardless of the skin area or size of the block. It might be supposed that a small chunk of fat and skin would feed too rapidly along the inclined table and beneath the toothed drum. However, considerable work is required to reduce the fat, and therefore the workpiece 26 will not feed beneath the drum any more rapidly than the fat can be reduced by the fine teeth with which the removable plates on the surface of the drum are provided. Successive workpieces placed on the table by the operator will feed by gravity until they reach the toothed drum, after which the combined effect of gravity and tooth movement is required to advance the workpieces beneath the drum.

Figure 8:
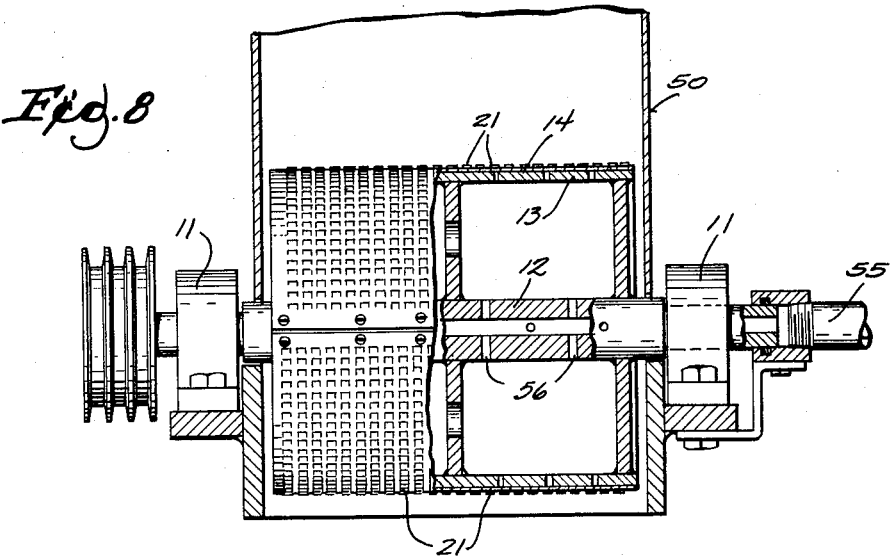
FIG. 8 is a view taken in section on the line 8—8 of FIG. 7, portions of the tooth-equipped drum being shown in elevation and portions being shown in axial section.

FIGS. 7 and 8 show the utility of the toothed drum made in this manner even when the problem is merely reduction rather than stripping edible fat from a skin. The housing section 50 constitutes a hopper into which chunks of fat or meat may be introduced as disclosed in my application Serial No. 809,943. The permanent casing 51 includes a shoulder at 52 toward which the toothed periphery of the drum 13 rotates. From the point of view of FIG. 7, the rotation is clockwise. The provision of teeth 21 is desirably the same as in FIGS. 1 to 3 or 4 and 5, there being teeth formed on removable plate sections 14 wrapped around the drum and secured peripherally thereto.

As the drum rotates, the workpiece 260 is forced snugly against the inner wall portion 53 of the hopper and the corresponding inner wall portion 54 of the chamber 51 which provides the shoulder 52. Since there is very slight clearance between the teeth and the shoulder 52, the material of the workpiece 260 is very finely reduced before it can pass the shoulder. The resulting reduced particles, many of which will be reduced to liquid form if the material is fat, are collected in any suitable container beneath the drum.

In practice, it will be found that in the use of the toothed drums as herein disclosed, approximately twenty-five percent of the fat will be reduced to liquid form and therefore mechanically rendered. It will be understood that in either embodiment a rendering operation may proceed immediately through the application of heat as suggested in FIG. 1, or otherwise, a further example being the steam pipe 55 and shaft duct 56 of FIGS. 7 and 8.

What is claimed is:

1. A device for removing edible fatty material from the skins of animals having both edible and nonedible fatty tissue formed thereon comprising, in combination, a rotatable drum, a cover removably mounted about said drum, said cover being formed with shallow, outwardly projecting sharp edges, defining teeth about the entire surface thereof, an adjustable table extending past said drum, stationarily supported in predetermined spaced relation with respect thereto, and inclined downwardly toward said drum in a plane parallel to the axis thereof, said table adapted to receive animal skins with the fatty portion toward said drum, means for rotating said drum in the direction of movement of the skin at such a speed that as the skin on said table is fed past said drum successive teeth engage the edible fatty portion thereof in order to gradually remove the same in minute particles to a depth determined by the space between said table and drum, and a receptacle positioned to collect the removed fat particles thrown outwardly from said drum by the rapid rotation thereof.

2. A device for removing edible fatty material from the skins of animals having both edible and nonedible fatty tissue formed thereon comprising, in combination, a rotatable drum, a cover removably mounted about said drum, said cover being formed with shallow, outwardly projecting sharp edges, defining teeth about the entire surface thereof, an adjustable table extending past said drum, stationarily supported in predetermined spaced relation with respect thereto, and inclined downwardly toward said drum in a plane parallel to the axis thereof, said table adapted to receive animal skins with the fatty portion toward said drum, means for rotating said drum in the direction of movement of the skin at such a speed that as the skin on said table is fed past said drum successive teeth engages the edible fatty portion thereof in order to gradually remove the same in minute particles to a depth determined by the space between said table and drum, a receptacle positioned to collect the removed fat particles, and a shroud disposed about said drum so as to direct fat particles toward said receptacle.

3. A device for removing edible fatty material from the skins of animals having both edible and nonedible fatty tissue formed thereon comprising, in combination, a rotatable drum, a cover removably mounted about said drum, said cover being formed with shallow, outwardly projecting sharp edges, defining teeth about the entire surface thereof, a table extending past said drum, means for making fine adjustment of the position of said table with respect to said drum, and for stationarily supporting the same in said adjusted position, inclined downwardly toward said drum in a plane parallel to the axis thereof, said table adapted to receive animal skins with the fatty portion toward said drum, means for rotating said drum in the direction of movement of the skin at such a speed that as the skin on said table is fed past said drum successive teeth engage the edible fatty portion thereof in order to gradually remove the same in minute particles to a depth determined by the space between said table and drum, a receptacle positioned to collect the removed fat particles thrown outwardly from said drum by the rapid rotation thereof.

4. A device for removing edible fatty material from the skins of animals having both edible and nonedible fatty tisue formed thereon comprising, in combination, a rotatable drum, a cover removably mounted about said drum, said cover being formed with shallow, outwardly projecting sharp edges, defining teeth about the entire surface thereof, an adjustable table extending past said drum, a jack screw disposed beneath said table for making fine adjustment of the position thereof with respect to said drum, and for stationarily supporting the same in said adjusted position, and inclined downwardly toward said drum in a plane parallel to the axis thereof, said table adapted to receive animal skins with the fatty portion toward said drum, means for rotating said drum in the direction of movement of the skin at such a speed that as the skin on said table is fed past said drum successive teeth engage the edible fatty portion thereof in order to gradually remove the same in minute particles to a depth determined by the space between said table and drum, a receptacle positioned to collect the removed fat particles, and a shroud disposed about said drum so as to direct fat particles toward said receptacle.

(References on following page)

References Cited in the file of this patent

UNITED STATES PATENTS

| | | | |
|---|---|---|---|
| 640,216 | Monk | Jan. 2, | 1900 |
| 690,525 | Marshall | Jan. 7, | 1902 |
| 1,054,656 | McFeely | Feb. 25, | 1913 |
| 1,256,574 | Knowlton et al. | Feb. 19, | 1918 |
| 1,551,767 | Oehmig | Sept. 1, | 1925 |
| 2,039,778 | Chojnacki | May 5, | 1936 |
| 2,277,248 | Nardi | Mar. 24, | 1942 |
| 2,529,286 | Fraser | Nov. 7, | 1950 |
| 2,551,042 | Nyrop | May 1, | 1951 |
| 2,579,326 | Lang | Dec. 18, | 1951 |
| 2,745,856 | Dayer et al. | May 15, | 1956 |
| 2,815,356 | Pavia | Dec. 3, | 1957 |